(12) United States Patent
Wang et al.

(10) Patent No.: US 10,476,642 B2
(45) Date of Patent: Nov. 12, 2019

(54) REFERENCE SIGNAL DESIGN

(71) Applicant: QUALCOMM Incorporated, San Diego, CA (US)

(72) Inventors: Renqiu Wang, San Diego, CA (US); Wei Zeng, San Diego, CA (US); June Namgoong, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/619,086

(22) Filed: Jun. 9, 2017

(65) Prior Publication Data
US 2018/0097594 A1    Apr. 5, 2018

Related U.S. Application Data

(60) Provisional application No. 62/443,608, filed on Jan. 6, 2017, provisional application No. 62/402,564, filed on Sep. 30, 2016.

(51) Int. Cl.
*H04L 5/00* (2006.01)
*H04L 27/26* (2006.01)
*H04W 72/04* (2009.01)

(52) U.S. Cl.
CPC ........ *H04L 5/0048* (2013.01); *H04L 27/2613* (2013.01); *H04W 72/0413* (2013.01)

(58) Field of Classification Search
CPC . H04L 5/0048; H04L 5/0094; H04L 27/2613; H04W 72/0413; H04W 72/042; H04J 11/00
See application file for complete search history.

(56) References Cited

U.S. PATENT DOCUMENTS

| | | | |
|---|---|---|---|
| 2010/0135242 A1 | 6/2010 | Nam et al. | |
| 2010/0246527 A1* | 9/2010 | Montojo | H04L 5/005 370/330 |

(Continued)

FOREIGN PATENT DOCUMENTS

| | | |
|---|---|---|
| EP | 3059917 A1 | 8/2016 |
| EP | 3157188 A1 | 4/2017 |

(Continued)

OTHER PUBLICATIONS

Partial International Search Report—PCT/US2017/053205—ISA/EPO—dated Feb. 2, 2018.

(Continued)

*Primary Examiner* — Michael Thier
*Assistant Examiner* — Nevena Zecevic Sandhu
(74) *Attorney, Agent, or Firm* — Patterson & Sheridan, LLP

(57) ABSTRACT

Various additional and alternative aspects are described herein. In some aspects, the present disclosure provides a method for wireless communication. The method includes determining at least one RS pattern for allocating a reference signal on an uplink channel and a downlink channel based on one or more transmission factors for transmitting the reference signal, wherein at least a portion of the at least one RS pattern is the same for the uplink channel and the downlink channel. The method further includes transmitting the reference signal using the determined RS pattern.

26 Claims, 11 Drawing Sheets

(56) References Cited

U.S. PATENT DOCUMENTS

| | | |
|---|---|---|
| 2010/0322179 A1 | 12/2010 | Yu et al. |
| 2011/0141928 A1* | 6/2011 | Shin ............... H04L 1/0028 370/252 |
| 2012/0106493 A1 | 5/2012 | Noh et al. |
| 2012/0155338 A1* | 6/2012 | Noh ............... H04L 5/0023 370/280 |
| 2012/0176885 A1* | 7/2012 | Lee ............... H04J 13/0048 370/209 |
| 2012/0320806 A1* | 12/2012 | Ji ............... H04B 7/2656 370/280 |
| 2013/0189930 A1* | 7/2013 | Kinnunen ............ H04W 16/12 455/67.11 |
| 2013/0343477 A9 | 12/2013 | Jia et al. |
| 2014/0161205 A1 | 6/2014 | Jalloul et al. |
| 2015/0071195 A1 | 3/2015 | Park et al. |
| 2016/0218856 A1* | 7/2016 | Adhikary ............ H04L 7/0037 |
| 2017/0041948 A1* | 2/2017 | Cheng ............... H04L 5/0051 |
| 2018/0063820 A1* | 3/2018 | Xiong ............... H04W 72/042 |
| 2019/0028245 A1* | 1/2019 | Gao ............... H04L 1/1861 |

FOREIGN PATENT DOCUMENTS

| | | | |
|---|---|---|---|
| EP | 3188537 A1 | 7/2017 | |
| WO | WO-2015000171 A1 * | 1/2015 | ........... H04L 5/0091 |
| WO | 2015194825 A1 | 12/2015 | |
| WO | 2016031683 A1 | 3/2016 | |
| WO | WO-2018027222 A1 * | 2/2018 | |
| WO | WO-2018063042 A1 * | 4/2018 | ........... H04L 5/0051 |

OTHER PUBLICATIONS

ZTE Corporation et al., "Discussion on Design of Reference Signals for NR MIMO", 3GPP Draft: R1-165037 Discussion on Design of Reference Signals for NR MIMO, 3rd Generation Partnership Project (3GPP), vol. RAN WG1, No, Nanjing, China; 20160523-20160527, May 14, 2016 (May 14, 2016), XP051096288, 3 Pages, Retrieved from the Internet: URL:http://www.3gpp.org/ftp/tsg_ran/WG1_RL 1/TSGR1_85/Doos/ [retrieved on May 4, 2016].
International Search Report and Written Opinion—PCT/US2018/018423—ISA/EPO—dated Apr. 24, 2018.

\* cited by examiner

REFERENCE SIGNAL DESIGN

CROSS-REFERENCE TO RELATED APPLICATIONS

This application claims the benefit of U.S. Provisional Patent No. 62/402,564, filed Sep. 30, 2016, and U.S. Provisional Patent No. 62/443,608, filed Jan. 6, 2017. The content of the provisional applications are hereby incorporated by reference in their entirety.

TECHNICAL FIELD

Certain aspects of the present disclosure generally relate to wireless communications and, more particularly, to techniques for communicating reference signals in wireless communication systems.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method for wireless communication. The method includes determining at least one RS pattern for allocating a reference signal on an uplink channel and a downlink channel based on one or more transmission factors for transmitting the reference signal, wherein at least a portion of the at least one RS pattern is the same for the uplink channel and the downlink channel. The method further includes transmitting the reference signal using the determined RS pattern.

In some aspects, the present disclosure provides an apparatus for wireless communication including a memory and a processor. The processor is configured to determine at least one RS pattern for allocating a reference signal on an uplink channel and a downlink channel based on one or more transmission factors for transmitting the reference signal, wherein at least a portion of the at least one RS pattern is the same for the uplink channel and the downlink channel. The processor is further configured to transmit the reference signal using the determined RS pattern.

In some aspects, the present disclosure provides an apparatus for wireless communication. The apparatus includes means for determining at least one RS pattern for allocating a reference signal on an uplink channel and a downlink channel based on one or more transmission factors for transmitting the reference signal, wherein at least a portion of the at least one RS pattern is the same for the uplink channel and the downlink channel. The apparatus further includes means for transmitting the reference signal using the determined RS pattern.

In some aspects, the present disclosure provides a computer readable medium having instructions stored thereon for causing at least one processor to perform a method. The method includes determining at least one RS pattern for allocating a reference signal on an uplink channel and a downlink channel based on one or more transmission factors for transmitting the reference signal, wherein at least a portion of the at least one RS pattern is the same for the uplink channel and the downlink channel. The method further includes transmitting the reference signal using the determined RS pattern.

In some aspects, the present disclosure provides a method, apparatus, system, computer program product, and processing system as substantially described herein with reference to and as illustrated by the accompanying drawings.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
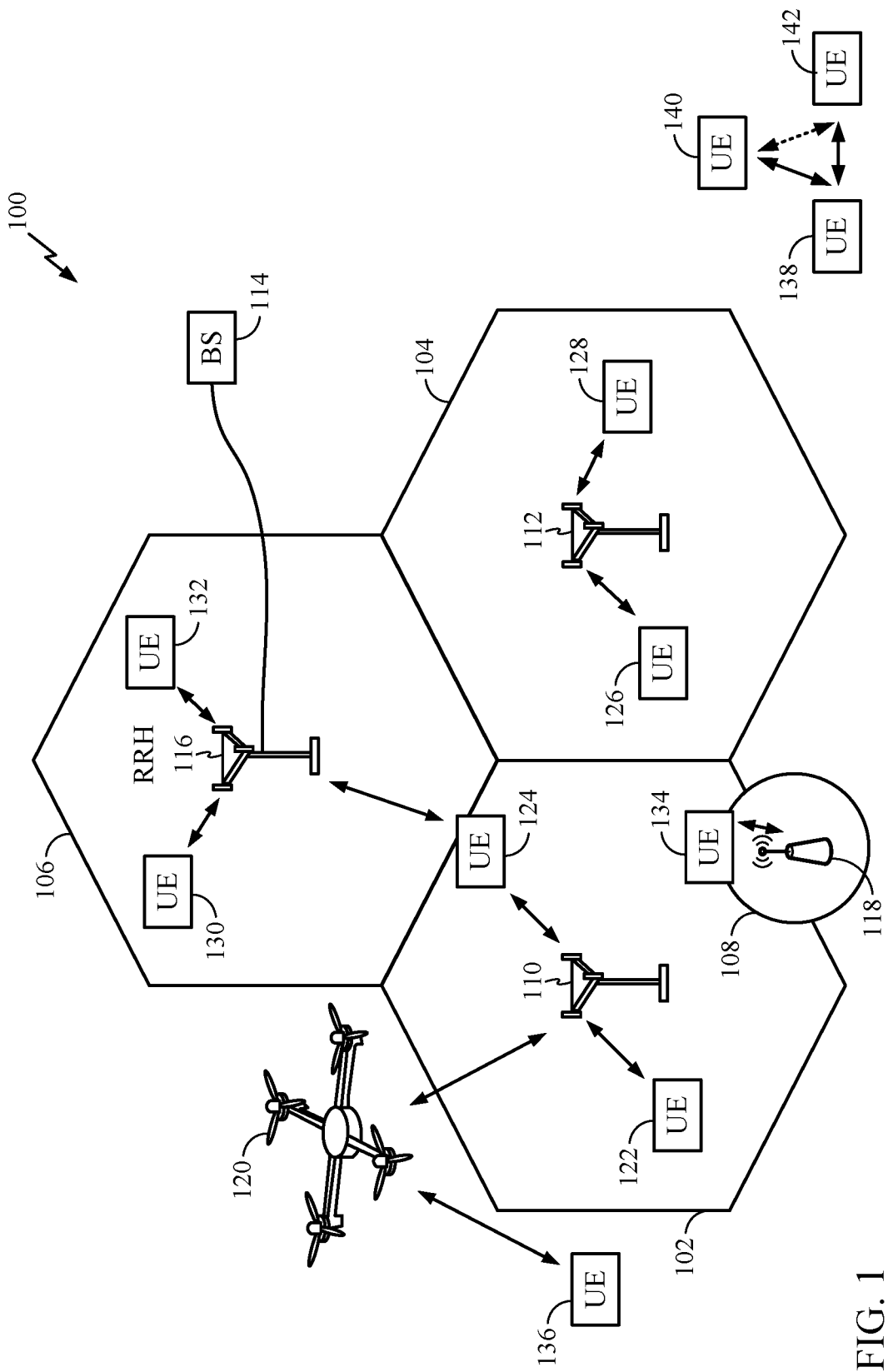
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. In certain aspects, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
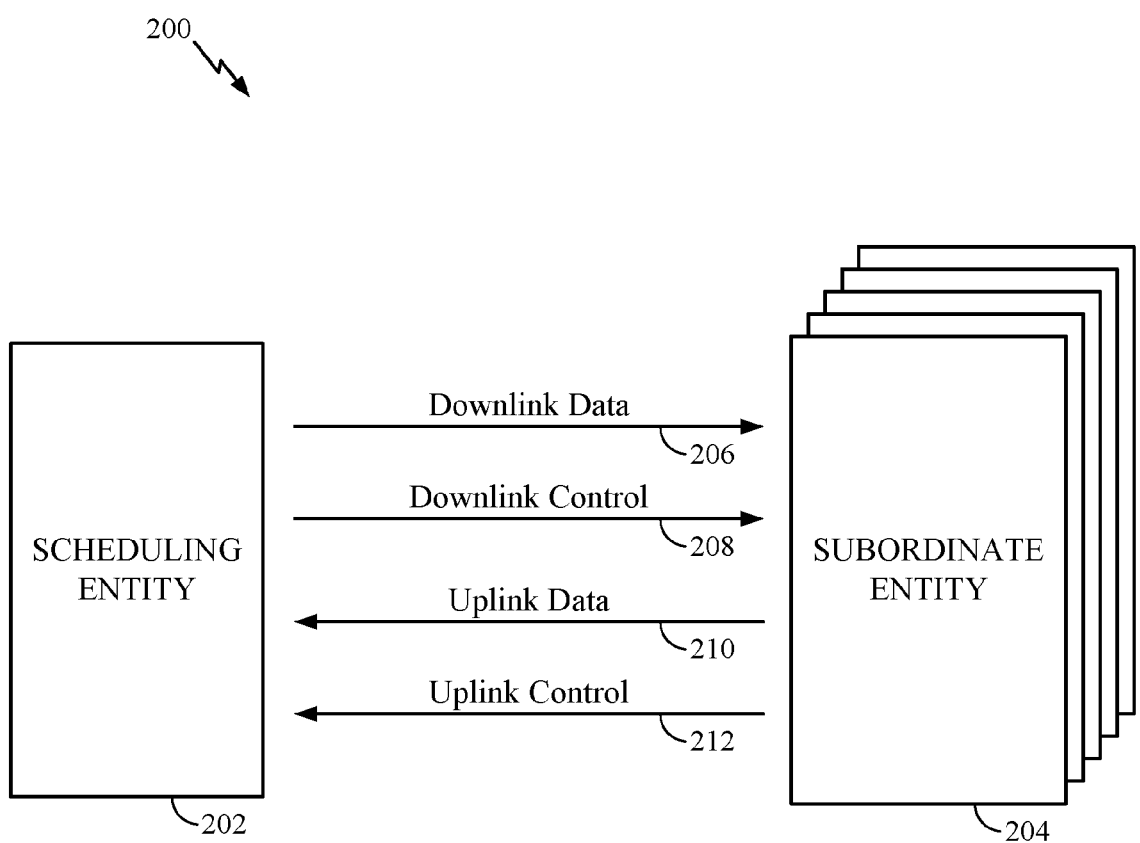
FIG. 2 is a diagram conceptually illustrating an example of a scheduling entity communicating with one or more subordinate entities according to some aspects of the present disclosure.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram 200 illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast downlink data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information (UCI) may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
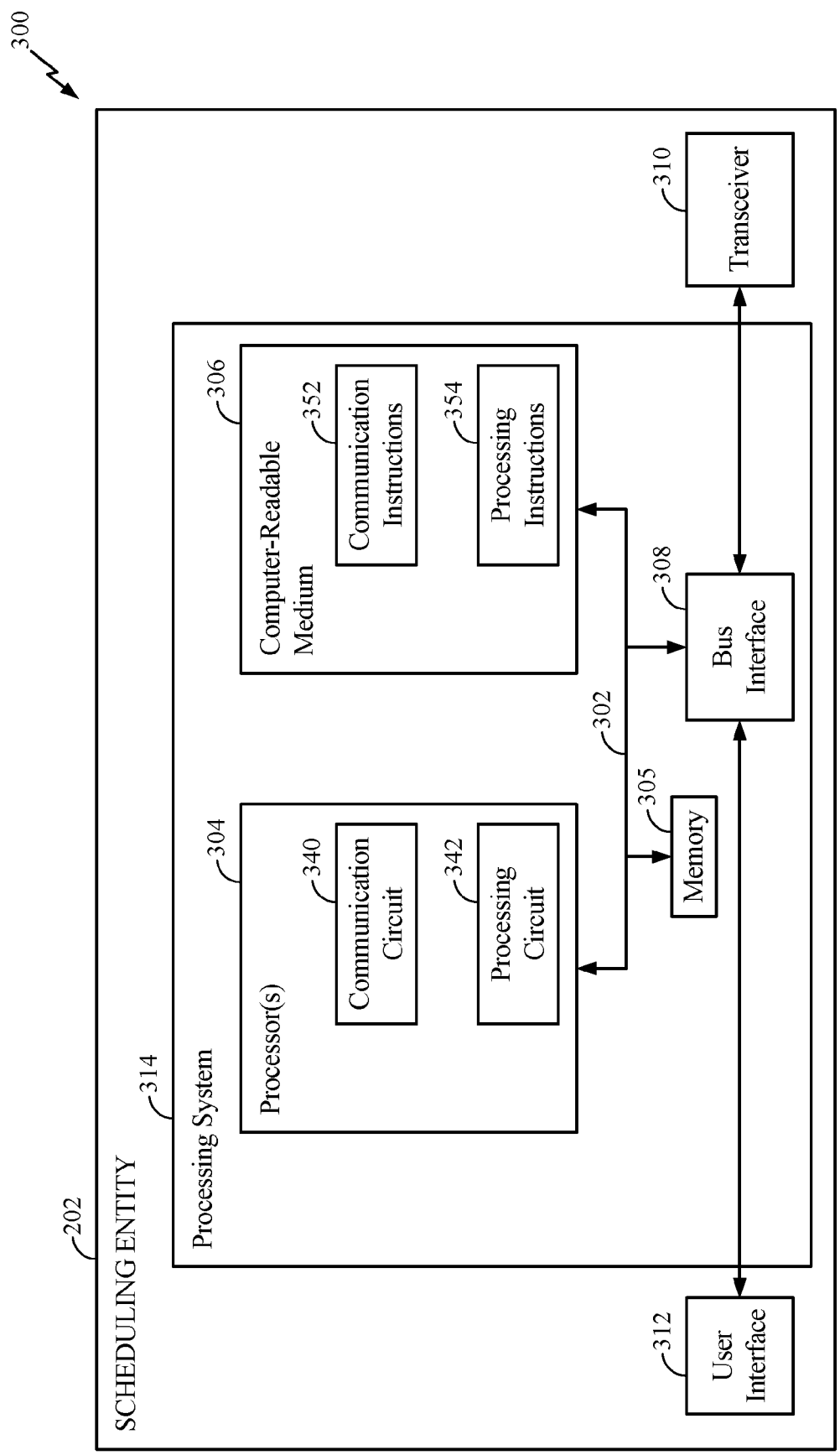
FIG. 3 is a diagram illustrating an example of a hardware implementation for a scheduling entity according to some aspects of the present disclosure.

FIG. 3 is a diagram 300 illustrating an example of a hardware implementation for scheduling entity 202 according to aspects of the present disclosure. Scheduling entity 202 may employ a processing system 314. Scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein, for example, in FIG. 10 or FIG. 11.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 340. The communication circuit 340 may include one or more hardware components that provide the physical structure that performs various processes related to wireless communication (e.g., signal reception and/or signal transmission) as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Figure 4:
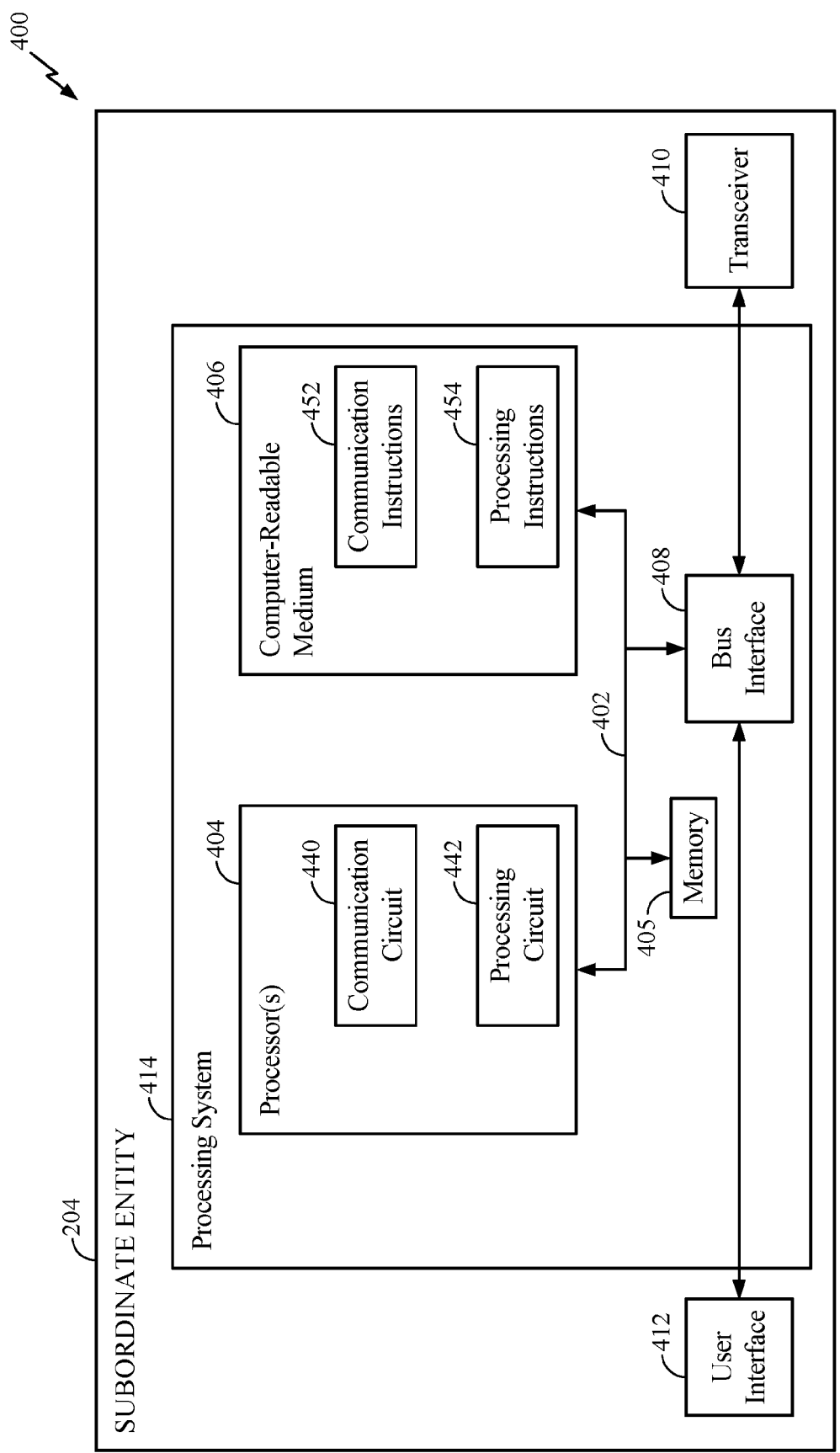
FIG. 4 is a diagram illustrating an example of a hardware implementation for a subordinate entity according to some aspects of the present disclosure.

FIG. 4 is a diagram 400 illustrating an example of a hardware implementation for subordinate entity 204 according to aspects of the present disclosure. Subordinate entity 204 may employ a processing system 414. Subordinate entity 204 may be implemented with a processing system 414 that includes one or more processors 404. Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, subordinate entity 204 may be configured to perform any one or more of the functions described herein. That is, the processor 404, as utilized in subordinate entity 204, may be used to implement any one or more of the processes described herein, for example, in FIG. 10 or FIG. 11.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

Figure 5:
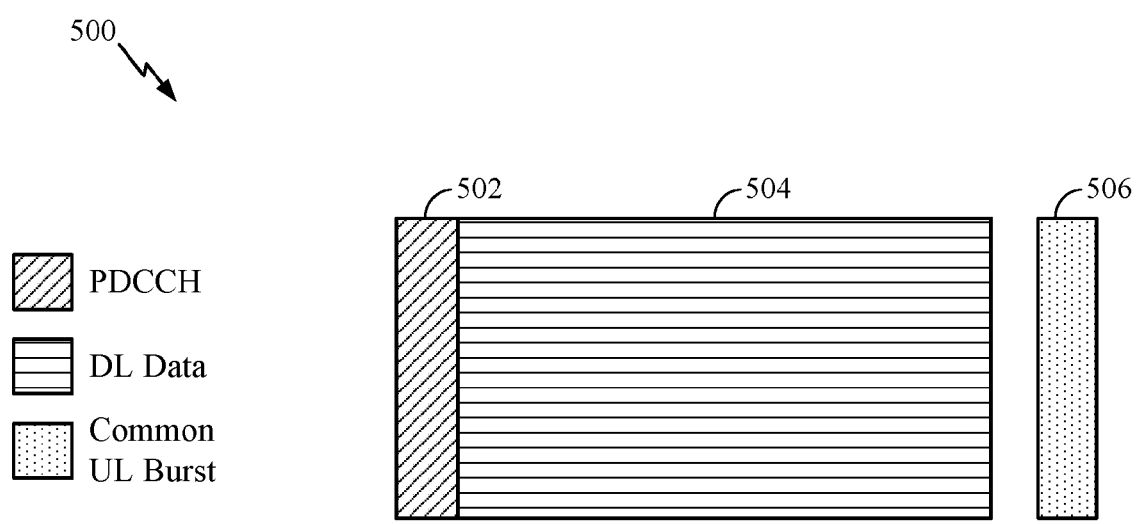
FIG. 5 is a diagram illustrating an example of a downlink (DL)-centric subframe according to some aspects of the present disclosure.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity 202 (e.g., eNB) to the subordinate entity 204 (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity 204 (e.g., UE)) to UL communication (e.g., transmission by the subordinate entity 204 (e.g., UE)).

One of ordinary skill in the art will understand that the foregoing is merely one example of a DL-centric subframe and alternative structures having similar features may exist without necessarily deviating from the aspects described herein.

Figure 6:
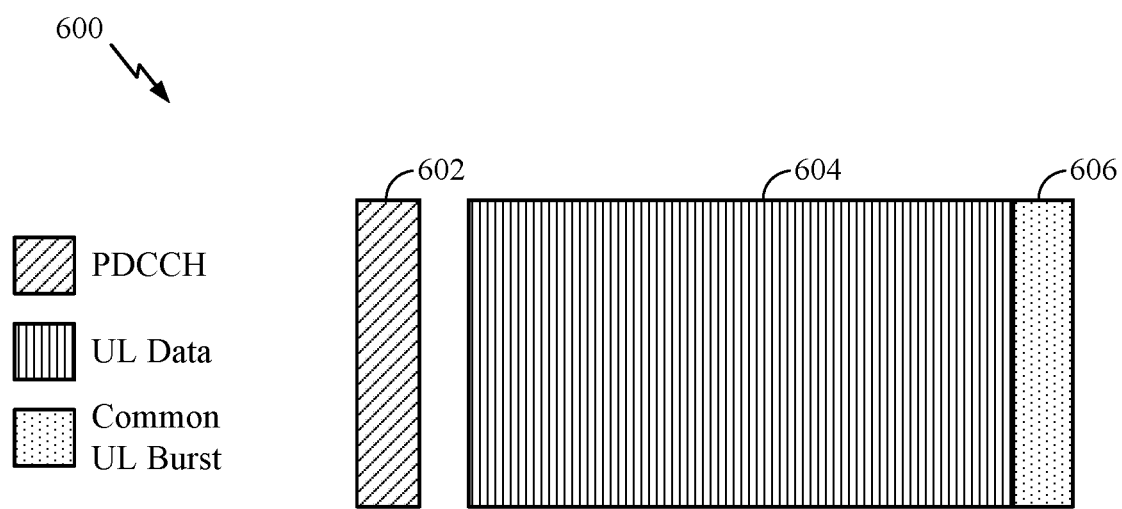
FIG. 6 is a diagram illustrating an example of an uplink (UL)-centric subframe according to some aspects of the present disclosure.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the payload of the UL-centric subframe. The UL portion may refer to the communication resources utilized to communicate UL data from the subordinate entity 204 (e.g., UE) to the scheduling entity 202 (e.g., eNB). In some configurations, the control portion 602 may be a physical UL shared channel (PUSCH), physical UL control channel (PUCCH), and/or include a sounding reference signal (SRS). As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL portion 606. The common UL portion 606 in FIG. 6 may be similar to the common UL portion 506 described above with reference to FIG. 5. The common UL portion 506 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Figure 7:
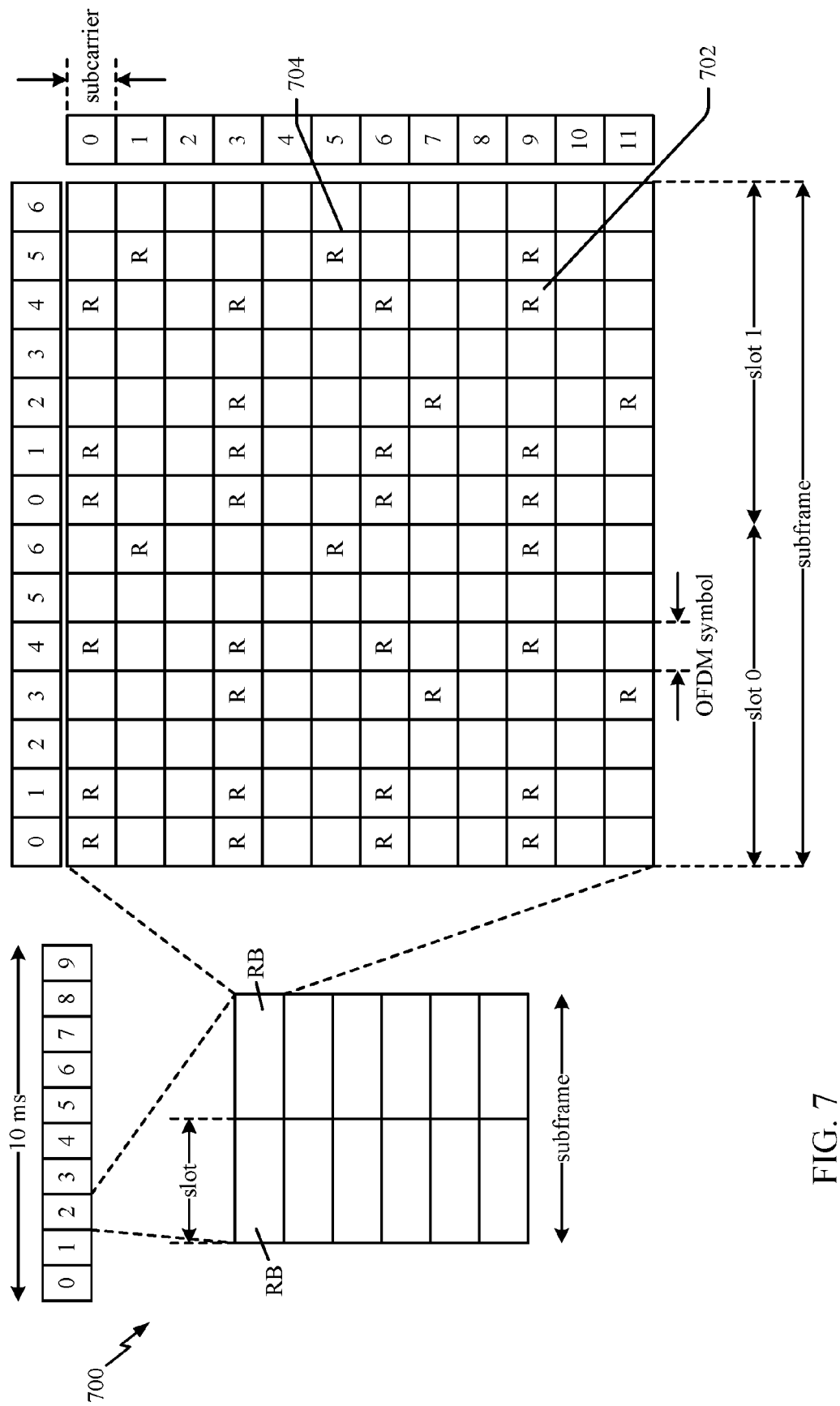
FIG. 7 is a diagram illustrating an example of a frame structure according to some aspects of the present disclosure.

FIG. 7 is a diagram 700 illustrating an example of a frame structure according to some aspects of the present disclosure. It should be noted that the frame structure described with respect to FIG. 7 is merely an example of a design principle for telecommunication systems, and any specific numbers of elements (e.g., subframes, time slots, resource blocks, symbols, resource elements, etc.) or the frame structure itself may be different for different telecommunication systems. The DL-centric subframes and UL-centric subframes described with respect to FIGS. 5 and 6 may be portions of DL and UL frames, respectively, that are divided into (e.g., equally sized) subframes. For example, a frame may span 10 ms, and be split into 10 subframes. Each sub-frame may include two consecutive time slots. A resource grid may be used to represent two time slots, each time slot including a resource block (RB). The resource grid is divided into multiple resource elements. For example, a resource block may contain 12 consecutive subcarriers in the frequency domain and 7 consecutive OFDM symbols in the time domain, or 84 resource elements. Since each sub-frame is made up of 2 time slots, and thus 2 resource blocks, each sub-frame includes 14 OFDM symbols. Some of the resource elements, as indicated as R 702, R 704, include reference signals (RS). In some aspects, the RS include Cell-specific RS (CRS) (also sometimes called common RS) 702 and UE-specific RS (UE-RS) 704. In some aspects, UE-RS 704 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

According to aspects of the present disclosure, techniques are provided to generate and transmit reference signals (RSs) on an uplink channel and/or a downlink channel by a UE and/or eNB, respectively. In particular, certain aspects provide techniques to generate and transmit reference signals on an uplink channel (e.g., PUSCH or PUCCH) and/or a downlink channel (e.g., PDSCH) by a UE and/or eNB, respectively. In some aspects, a design of the reference signals transmitted on a downlink channel is symmetric to a design of the reference signals transmitted on an uplink channel. For example, in some aspects, the design of the reference signals is symmetric or the same for the PUSCH, PUCCH, and/or the PDSCH. In some aspects, CRS is not transmitted on the downlink channels (e.g., PDSCH) and only a demodulation reference signal (DM-RS) is transmitted on the downlink channels (e.g., PDSCH). Accordingly, complexity of reference signal design for both a UE and eNB can be reduced since both the uplink channels and downlink channels use the same DM-RS. Further, in certain aspects, channel interference estimation and possible interference cancellation may be improved based on the use of a symmetric RS design, as further discussed herein.

In certain aspects, transmission on the DL (e.g., PDSCH) by the eNB may be made using OFDM waveforms. In some aspects, in OFDM, the eNB may operate sufficiently regardless of the peak-to-average power ratio (PAPR) of transmissions, so in certain aspects, the sequences used for reference signals may not necessarily need to be optimized. However, in certain aspects, on the UL, mixed waveforms may be used for transmissions by UEs, for example, because a UE may have limited transmit power. For example, UEs near the cell edge (e.g., UEs with a low signal-to-noise ratio) may have a limited link budget. In some aspects, such UEs near the cell edge may utilize single carrier-FDM (SC-FDM) waveforms for transmissions on the PUSCH because they have lower PAPR than OFDM. However, other UEs (e.g., UEs with a sufficient signal-to-noise ratio) may still utilize OFDM waveforms for transmissions on the PUSCH. Further, in some aspects, UEs may utilize SC-FDM waveforms for transmissions on the PUCCH.

Figure 8:
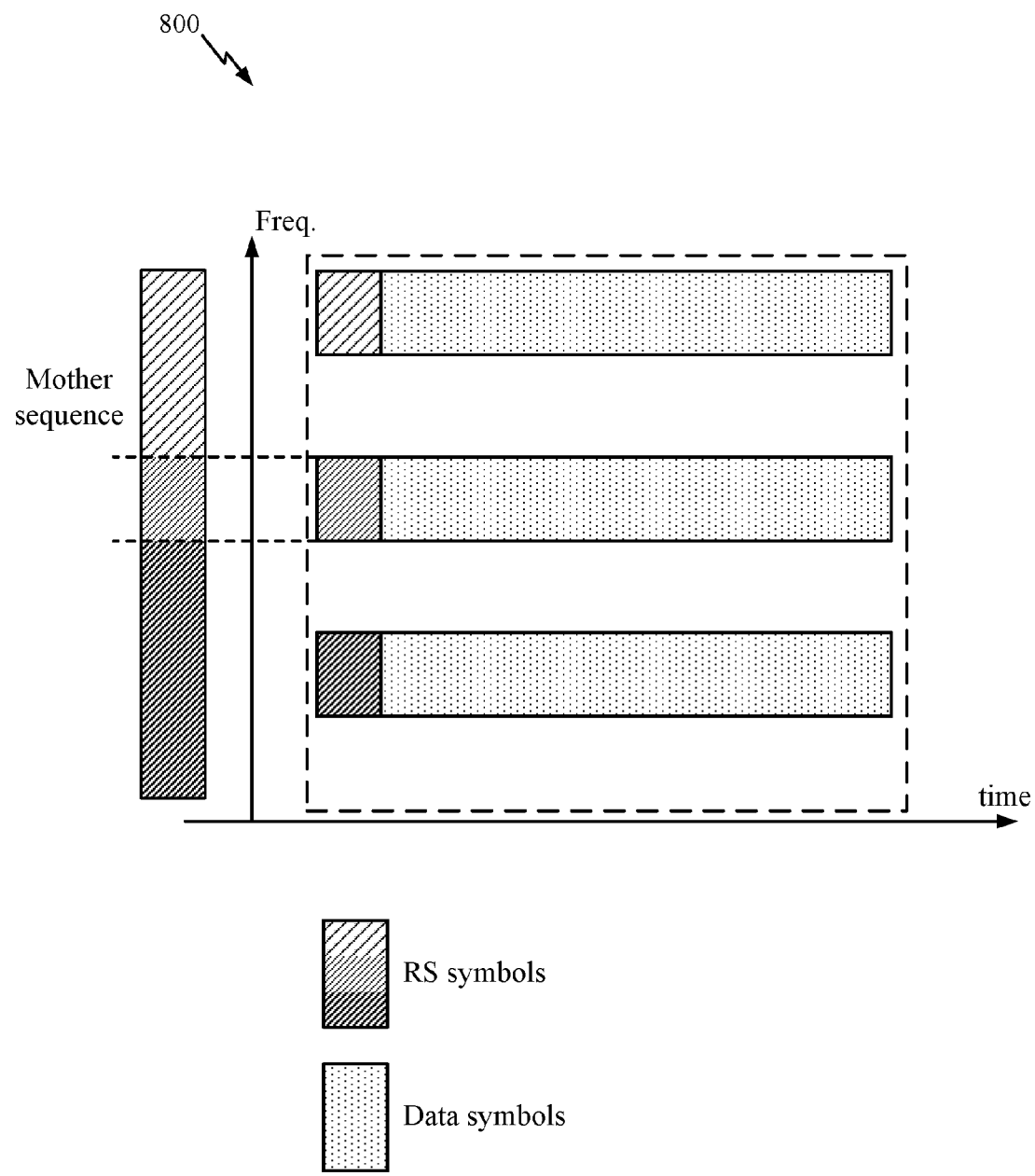
FIG. 8 is a diagram illustrating an example of a reference signal (RS) sequence allocation for generating RSs based on a resource block (RB) location of the RS according to some aspects of the present disclosure.

In some aspects, the RS sequence (e.g., sequence of bits) used to generate an RS (by a UE or an eNB) may be based on the RB location (e.g., instead of just the number of RBs) used by an entity (e.g., eNB or UE) for transmission. For example, FIG. 8 is a diagram 800 illustrating an example of a RS sequence allocation for generating RSs based on a RB location (e.g., RB index) of the RS according to some aspects of the present disclosure. In some aspects, the RS sequence allocation discussed with respect to FIG. 8 may be used for both the PDSCH and the PUSCH (e.g., for transmissions on the PUSCH using OFDM waveforms and single input multiple output (SIMO) transmissions). As shown, a "mother sequence" may be allocated (e.g., pre-determined, defined, programmed, etc.) over the communication bandwidth (e.g., entire communication bandwidth) of a channel (e.g., across all resource blocks of the channel). The mother sequence may be any suitable type of sequence, such as a Quadrature Phase Shift Keying (QPSK) sequence occupying the bandwidth (e.g., entire bandwidth) of the channel (e.g., PDSCH or PUSCH). In certain aspects, the mother sequence may be a low PAPR sequence such as Chu sequence or computer generated sequence (CGS). In some aspects, the same mother sequence is used for the DL and UL in a given cell. In some aspects, different mother sequences may be used for the DL and UL in a given cell. In some aspects, different mother sequences are used for channels in different cells.

Further, in certain aspects, a particular entity (e.g., eNB or UE) may transmit data in one or more RBs allocated to the entity. The entity may accordingly include a RS in each RB that the entity transmits data. In some aspects, the RS may be a front loaded RS. In some aspects the first or second symbol of the RB includes the RS and the remaining symbols of the RB include the data. In some aspects one or more symbols in the first half of the slot includes the RS and the remaining symbols of the RB include the data. In some aspects, to generate the RS for an RB, the entity utilizes the segment of the mother sequence allocated to the same bandwidth as the RB as the sequence for generating the RS. Accordingly, in such aspects, the RS sequence used for the RB depends only on the RB index of the RB including the RS. Each entity may store/have access to information regarding the mother sequence, and therefore stores/has access to information regarding the RS sequence used for a particular RB index. Accordingly, each entity has information and can determine the RS sequence used for a received RS based on the RB index of the RB the RS is included in.

Performing interference estimation and possible interference cancellation may be easier because the RS sequence used for an RS in a RB is known to the receiving entity. For example, even if an entity receives transmissions (e.g., UL or DL transmission) in RBs from other entities in neighboring cells along with transmissions (e.g., DL transmissions) from its own cell, it can still estimate the interference as the RS sequence used for each RB is known. Further, in aspects where the same RS design is used for the UL and the DL, it does not matter if the interfering transmissions received by the entity are UL or DL transmissions that interfere with the entity's DL transmissions, as the interference estimation and calculation is still the same as the UL and DL use the same RS design.

Figure 9:
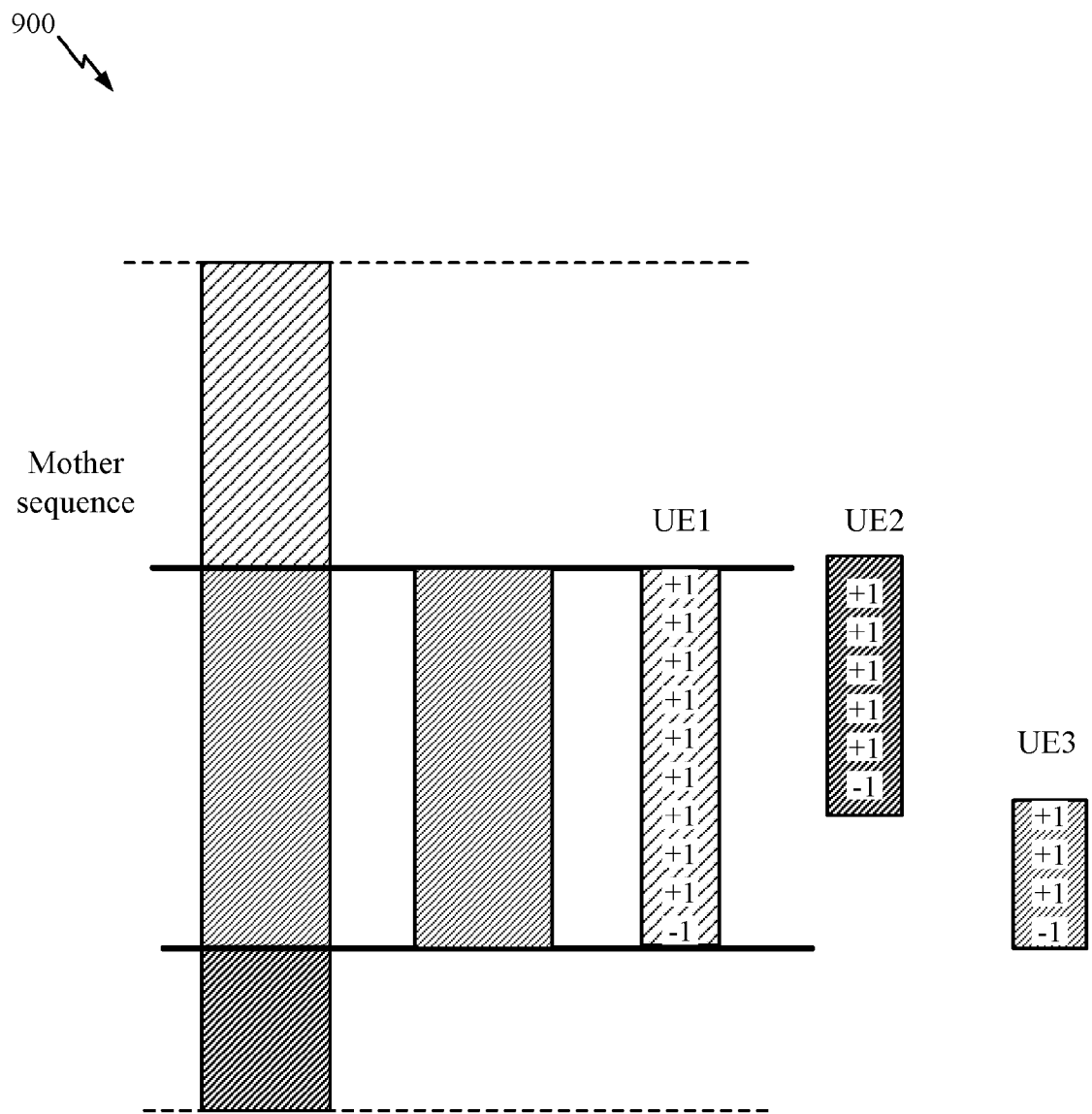
FIG. 9 is a diagram illustrating an example of a RS sequence allocation for generating RSs based on a RB location of the RS and an orthogonal cover for the RS sequence according to some aspects of the present disclosure.

In some aspects, OFDM waveforms and multi-user multiple-input-multiple-output (MU-MIMO) transmissions are used on the PUSCH by UEs. Accordingly, for a particular RB, there may be two or more UEs transmitting in the same bandwidth simultaneously. In certain aspects, it may be desirable to have orthogonal RS sequences for the two or more UEs to prevent interference. Accordingly, in certain aspects, the UE may still use the segment of the mother sequence allocated to the RB used for transmission to generate the RS for the RB, such that the RS sequence for the RB is based on the RB index. However, the UE may further modulate the segment with an orthogonal cover (e.g., Walsh code, discrete Fourier transform (DFT) matrix (e.g., phase ramping), etc.). In some aspects, each UE may use a different orthogonal cover (e.g., which may be synchronized in time across the UEs, such as using similar techniques as synchronizing Walsh codes in CDMA), and therefore, the actual RS sequence used by each UE may be different. For example, FIG. 9 is a diagram 900 illustrating an example of a RS sequence allocation for generating RSs based on a RB location of the RS and an orthogonal cover for the RS sequence according to some aspects of the present disclosure. As shown, each of the UE1, UE2, and UE3 utilize different orthogonal covers (e.g., different cover sequences of +1's and −1's). In some aspects, UEs with misaligned allocations of bandwidth may also be supported, accordingly, as the RS sequences are still orthogonal for the misaligned RSs.

In some aspects, as discussed, SC-FDM waveforms are used on the PUSCH by UEs. As discussed, UEs using such SC-FDM waveforms may have low PAPR requirements for transmissions. In some aspects, utilizing segments of the mother sequence discussed herein as the RS sequence for RSs may meet the low PAPR requirement. In some aspects, utilizing segments of the mother sequence discussed herein as the RS sequence for RSs may not generate RSs that meet the low PAPR requirement.

Accordingly, in some aspects, instead of using segments of a mother sequence as the RS sequence for generating a RS, sequences with low PAPR (e.g., Chu sequences, computer generated sequences (CGS), etc.) are used as the RS sequence for generating the RS. For example, in certain aspects, if one RB is used for transmission by a UE, a CGS sequence may be used. In certain aspects, if two or more RBs are used for transmission by a UE, a Chu sequence may be used.

Further, the sequence selected for generating the RS sequence for an RB may be based on the number of RBs used for transmission by the UE, and further may be based on the relative index/location of the RB among the RBs used for transmission. For example, a plurality of low PAPR sequences may be included in a table indexed by the number of RBs used, or mapped based on a hash function of the number of RBs used. Accordingly, the UE may select the low PAPR sequence to use for generating one or more RS sequences for the one or more RBs by using the number of RBs used to index or hash the table. The table and/or hash function may be stored at each entity.

The selected low PAPR sequence may include a number of sub-sequences that corresponds to the number of RBs that map to the particular low PAPR sequence. For example, if the low PAPR sequence is selected based on the UE using N (where N is a positive integer) RBs for transmission, then the corresponding PAPR sequence includes N sub-sequences. The sub-sequences may just refer to portions of the low PAPR sequence. These sub-sequences are used as the corresponding RS sequences for each of the RBs used for transmission by the UE. In particular, in some aspects, the sub-sequence used for a particular RB may be based on the relative RB index of the RB. For example, the sequence may be divided into N sub-sequences ordered from 1 to N corresponding to the position of the sub-sequence in the actual sequence from start to end. Further, the RBs used for transmission may similarly be ordered from 1 to N (which may be referred to as the relative RB index of the RB) based on the actual RB index (e.g., from the lowest actual RB index RB to the highest actual RB index RB). The RS sequence for a particular RB with a relative RB index of N, therefore may be selected as the corresponding sub-sequence N.

Accordingly, the selection of the RS sequence for a particular RB in such aspects is still based on the RB index as it is based on the relative RB index in the assigned band, but not necessarily the absolute RB index as discussed with respect to the mother sequence example.

In such aspects where the sequence is based on the number of RBs and the starting RB index, for transmissions on a particular RB, the RS sequence used is not deterministic as the RS sequence used is based on the allocated bandwidth (RBs) for the UE transmitting the RS. Accordingly, an entity that is trying to perform interference estimation or cancellation when receiving the RB with the RS may need to perform hypothesis testing to determine the actual RS sequence used. The entity may need to perform the hypothesis testing for each possible combination of number of RBs and starting RB index, which may be computationally expensive (e.g., time, energy, etc.). Accordingly, in certain aspects, the number of RBs and/or RB indexes that can be used by a UE (e.g., cell edge UE) when communicating using SC-FDM waveforms on the PUSCH may be limited to limit the possible combinations that need to be tested. For example, such a UE may only be able to use a certain number of RBs selected from a set of possible numbers of RBs (e.g., {1,2,3,4}, {1,2,4}, {2,4,6}, etc.). Further, the UE may only be able to use certain RB indexes selected from a set of possible RB indexes (e.g., {1,2,3,4}, {1,2,4}, {2,4,6}, etc.).

In some aspects, even when SC-FDM waveforms are used on the PUSCH by UEs, the RS sequence used to generate an RS for a RB may be segments of a mother sequence allocated to the RB as discussed. As discussed, the RS sequence may yield a high PAPR, which may lead to some of the samples having high transmit power levels for the UE. In certain aspects, if the transmit power level of a UE is too high, the power amplifier of the UE may clip the transmissions of the UE. Accordingly in certain scenarios, the UE may try to perform backoff to reduce the transmit power and avoid such clipping of transmissions. However, in certain aspects, when transmitting the RS as discussed, the UE may not perform backoff and the power amplifier of the UE may reach a saturation/clipping point and clip portions of the transmission of the RS. This may lead to distortion or noise of the transmitted RS. However, the distortion is only limited to the RS, and may still yield adequate channel estimation performance.

In certain aspects, transmissions on the PUCCH may also utilize SC-FDM waveforms for transmissions. In certain aspects, the size of the payload of a frame transmitted on the PUCCH may vary (e.g., 1 to a few hundred bits). Accordingly, for certain payload sizes, the frame structure of the PUCCH may be different from the PUSCH or PDSCH, and therefore a different RS design may be used for such frames than used for the PUSCH or PDSCH. For certain payload sizes, the frame structure of the PUCCH may be the same as the PUSCH (e.g., the payload size of a frame structure of the PUCCH is substantially equal (e.g., within a threshold size) of the payload size of a frame structure of the PUSCH), and therefore a same RS design (e.g., as discussed with respect to SC-FDM waveforms used on the PUSCH) may be used for such frames as used for the PUSCH.

Figure 10:
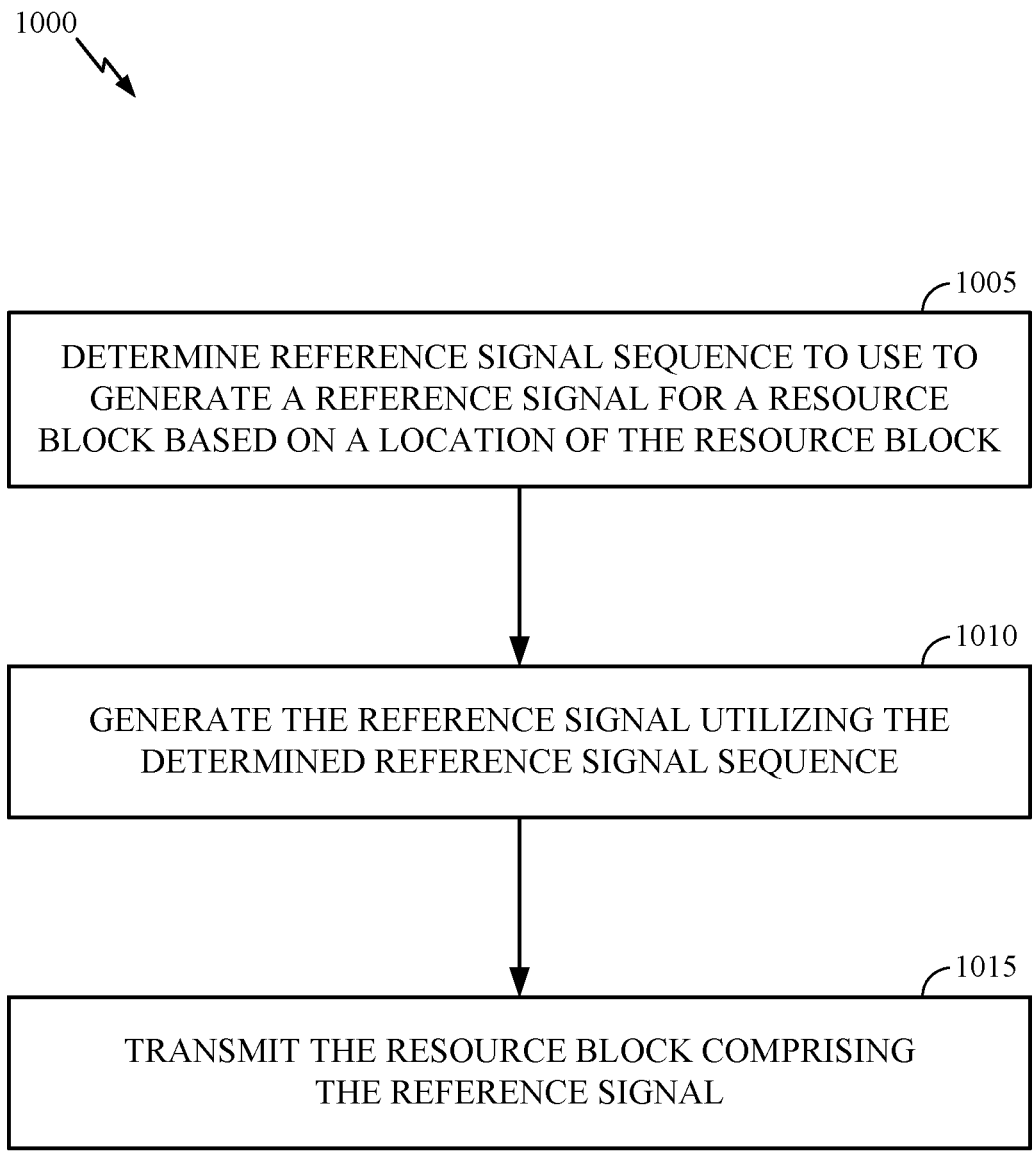
FIG. 10 is a flowchart illustrating example operations for generating an RS according to some aspects of the present disclosure.

FIG. 10 is a flowchart illustrating example operations 1000 for generating an RS according to some aspects of the present disclosure. At 1005, a reference signal sequence to use to generate a reference signal for a resource block is determined based on a location of the resource block. At 1010, the reference signal is generated utilizing the determined reference signal sequence. At 1015, the resource block comprising the reference signal is transmitted.

In some configurations, such operations, methods, and/or processes may be performed and/or implemented in the subordinate entity 204 or the scheduling entity 202.

Certain aspects discussed above relate to determining a RS sequence to use to generate a RS. According to further aspects of the present disclosure, techniques are provided to allocate the RS to transmission resources (e.g., in time and/or frequency, in a RB, etc.), and to transmit the RS in the allocated transmission resources. For example, certain aspects relate to techniques for specifying/determining a RS pattern (e.g., a number of symbols and a location of symbols (e.g., in an RB, overall bandwidth, etc.) and/or a number of tones in one or more symbols) to use to transmit the RS. In certain aspects, the techniques for allocating RS to resources may be used in conjunction with techniques and aspects described herein for determining a RS sequence to use to generate the RS. In certain aspects, the techniques for allocating RS to resources may be used in conjunction with other techniques for generating the RS.

In certain aspects, the number of symbols and location of symbols used to transmit a RS may be the same for both uplink channels and downlink channels. Further, in certain aspects, the number of symbols and location of symbols used to transmit a RS may additionally be the same for different types of waveforms (e.g., OFDM, SC-FDM, etc.). By utilizing the same number of symbols and location of symbols for transmitting RS, even though the RS sequence used may not be the same between UL, DL, and/or waveform type, some of the same hardware (e.g., processors) of the devices transmitting/receiving the RS may be able to be used to process (e.g., generate, receive and process, etc.) the RS. This can save in complexity and cost of the device design.

In certain aspects, though the number of symbols and location of symbols used to transmit a RS may be common regardless of whether the RS is transmitted on UL/DL, and/or the waveform type used to transmit the RS, the specific number and location of symbols the RS is allocated to may be based on one or more transmission factors (e.g., payload size (e.g., data) to be transmitted with the RS; Doppler mode (e.g., low, medium, high Doppler conditions); transmission configuration (e.g., SIMO, MIMO, MU-MIMO, other MIMO configuration, etc.); turnaround time requirement (e.g., the time from receiving a DL data to transmitting, such as transmitting an ACK; etc.). For example, if the payload size is larger (e.g., 500 bits), Doppler mode is low, and transmission configuration is SIMO for transmission, then the RS may be a front loaded RS where the RS is allocated to the first symbol (e.g., earliest in time) of the transmission (e.g., first symbol of the RB) and the remaining symbols of the transmission include the data. Further, the RS may be allocated to every tone of the first symbol in certain aspects. In another example, the RS may be allocated to the second symbol of the transmission and the remaining symbols of the transmission include the data. For example, the RS may be allocated by configuring a starting tone index parameter corresponding to the first tone to include the RS. In another example, if the payload size is smaller (e.g., 200 bits), Doppler mode is high, and transmission configuration is SIMO for transmission, then the RS may be allocated to multiple symbols (e.g., 2 symbols, such as the front symbol and a symbol in the middle of the transmission) of the transmission (e.g., RB). Further, in certain aspects, the RS is allocated to a subset of the tones (e.g., every other tone, odd tones, even tones, ¼ of the tones, ⅙ of the tones, equal spacing between tones allocated, etc.) of the symbols, for example based on configuring a demodulation reference signal (DMRS) ratio parameter. The remaining tones may be used for data transmission. In certain aspects, an eNB may determine the transmission factors to use for transmitting a particular RS and allocate RS accordingly for DL communication. Further, in certain aspects, for UL communication, the eNB may determine the transmission factors and indicate the transmission factors in an UL grant to the UE. The UE may utilize information in the UL grant to allocate RS accordingly for UL communication. In certain aspects, the transmission factors on implicitly or explicitly communicated/determined.

In certain aspects, the RS sequence used for RS may be different on the UL and DL, and/or may be different for different OFDM waveforms (e.g., DFT based OFDM (DFT- OFDM), cyclic prefix (CP) based OFDM (CP-OFDM), etc.), even if the allocation is the same. For example, in certain aspects, RS on the UL and DL using an OFDM waveform may each be generated using a different mother sequence. In certain aspects, an RS for a DFT-OFDM waveform may use a Chu sequence that depends on the number of RBs allocated for transmitting RS. In certain aspects, an RS for a DFT-OFDM waveform may use a portions of a Chu sequence that depends on the RBs locations allocated for transmitting RS. In certain aspects, an RS for a CP-OFDM waveform may use portions of a mother sequence depending on RB location of the RB allocated for the RS.

In certain aspects, for a symbol with RS allocated to the symbol, the tones used to transmit the RS may be configurable by a scheduling entity (e.g., eNB). For example, the eNB may configure the tones used to transmit the RS on the UL and DL, and communicate such information (implicitly, explicitly, etc.) to the UEs. In certain aspects, on the DL, the eNB may configure RS to occupy all tones of the symbol carrying RS. In certain aspects, on the UL or DL, the eNB may configure RS to occupy all tones of the symbol carrying RS. In certain aspects, on the UL or DL, the eNB may configure RS as comb based (e.g., frequency division of tones allocated for RS). For example, the eNB may configure RS to occupy every other tone, odd tones, even tones, ¼ of the tones, ⅙ of the tones, equal spacing between tones allocated, etc. of the symbol carrying RS.

In certain aspects, on the DL, other tones in a symbol not allocated to RS may be used for other transmissions. For example, where RS on the DL is transmitted using an OFDM waveform, the other tones may be used for transmission of data to the same UE that the RS is transmitted to, for transmission of data to a different UE, and/or transmissions on a different antenna port than used by the eNB to transmit the RS.

An antenna port may be defined as follows. An eNB may use multiple physical antennas for transmissions. However, the eNB may not use each antenna separately for transmissions. Instead, the eNB may combine certain antennas and use the combination (e.g., linear combination) of antennas as essentially one virtual antenna for transmission. Each virtual antenna (e.g., a single antenna or combination of antennas) utilized for transmissions may be "visible" to the UE and be referred to as an antenna port. The UE may not be able to distinguish whether a virtual antenna corresponds to one physical antenna or multiple physical antennas.

In certain aspects, on the UL, other tones in a symbol not allocated to RS may be used for other transmissions. For example, where RS on the UL is transmitted using an OFDM waveform, the other tones may be used for transmission of data from the same UE that the RS is transmitted from, for transmission of data from a different UE, and/or transmissions on a different antenna port than used by the UE to transmit the RS. For example, where RS on the UL is transmitted using a DFT-OFDM or SC-FDM waveform, the other tones may not be used for transmission for the same UE on the same antenna port (which may break the SC-FDM transmission). The other tones, however, may be used for transmission of RS of a different UE and/or transmissions of RS on a different antenna port from the same UE.

One example of a RS design as comb based for MU-MIMO with mixed waveform transmissions is as follows. Different waveforms may be separated with different combs in a symbol. For example, RS of UEs using CP-OFDM may be allocated to even tones and RS of UEs using DFT-OFDM may be allocated to odd tones. Further, for UEs using the same waveform, the RS may be made orthogonal using CDM (e.g., different cyclic shifts) so that multiple RS for multiple UEs are multiplexed in the same tones. Further, for UEs using the same waveform or different waveforms, the RS may be transmitted in different combs.

Another example of a RS design as comb based for MIMO transmissions is as follows. Transmissions for different antenna groups (e.g., physical antenna groups, antenna port groups, etc.) may be separated with different combs in a symbol. For example, RS transmitted by a first antenna group (e.g., including antenna ports 1 and 2) may be allocated to even tones, and RS transmitted by a second antenna group (e.g., including antenna ports 3 and 4) may be allocated to odd tones. Further, for antennas (e.g., antenna ports, physical antennas) within the same group, the RS transmitted by each antenna may be made orthogonal using CDM (e.g., different cyclic shifts) so that multiple RS for multiple antennas are multiplexed in the same tones.

In certain aspects, the reference signal sequences transmitted in different combs may be different sub-sequences of the same mother sequence according to the corresponding comb locations. In certain aspects, the reference signal sequences transmitted in different combs may use different mother sequences.

As discussed, in certain aspects, the eNB may communicate the allocation of RS tones implicitly, explicitly, etc. to the UEs. For example, in certain aspects the eNB explicitly includes the RS allocation information in a UL grant transmitted to the UE. The allocation information may include, for example, an indication of a starting tone in a symbol allocated for RS (e.g., per antenna port) and a density (e.g., all tones, half of the tones, ¼ tones, ⅙ tones, etc. of the tones of the symbol) of tones allocated for RS. Accordingly, the starting tone and spacing between tones allocated for RS may be determined by the UE. Further, the eNB may indicate in the UL grant how other tones in the symbol can be used (e.g., whether they can be used for data transmission or not).

In certain aspects, the eNB implicitly indicates the RS allocation information to the UE. For example, as discussed, the allocation may be based on one or more transmission factors of the RS. Each set of one or more transmission factors may map to a particular RS allocation. In certain aspects, the implicit indication may only work for single waveform RS communications. Accordingly, in certain aspects, where implicit indication is used, there may be a default mode where the UE assumes no MU-MIMO with mixed waveforms is used (or the UE assumes MU-MIMO with mixed waveforms is used). Further, in certain aspects, the UL grant may include an indication (e.g., 1 bit) of whether MU-MIMO is configured/used or not.

In one example, if low Doppler mode is used, and turnaround is immediate, and no MU-MIMO with mixed waveform is used, then all tones may be allocated for RS in a symbol.

In another example, if low Doppler mode is used, and turnaround is immediate, and MU-MIMO with mixed waveform is used, then even tones may be allocated for RS using CP-OFDM in a symbol, and odd tones may be allocated for RS using DFT-OFDM in a symbol.

Figure 11:
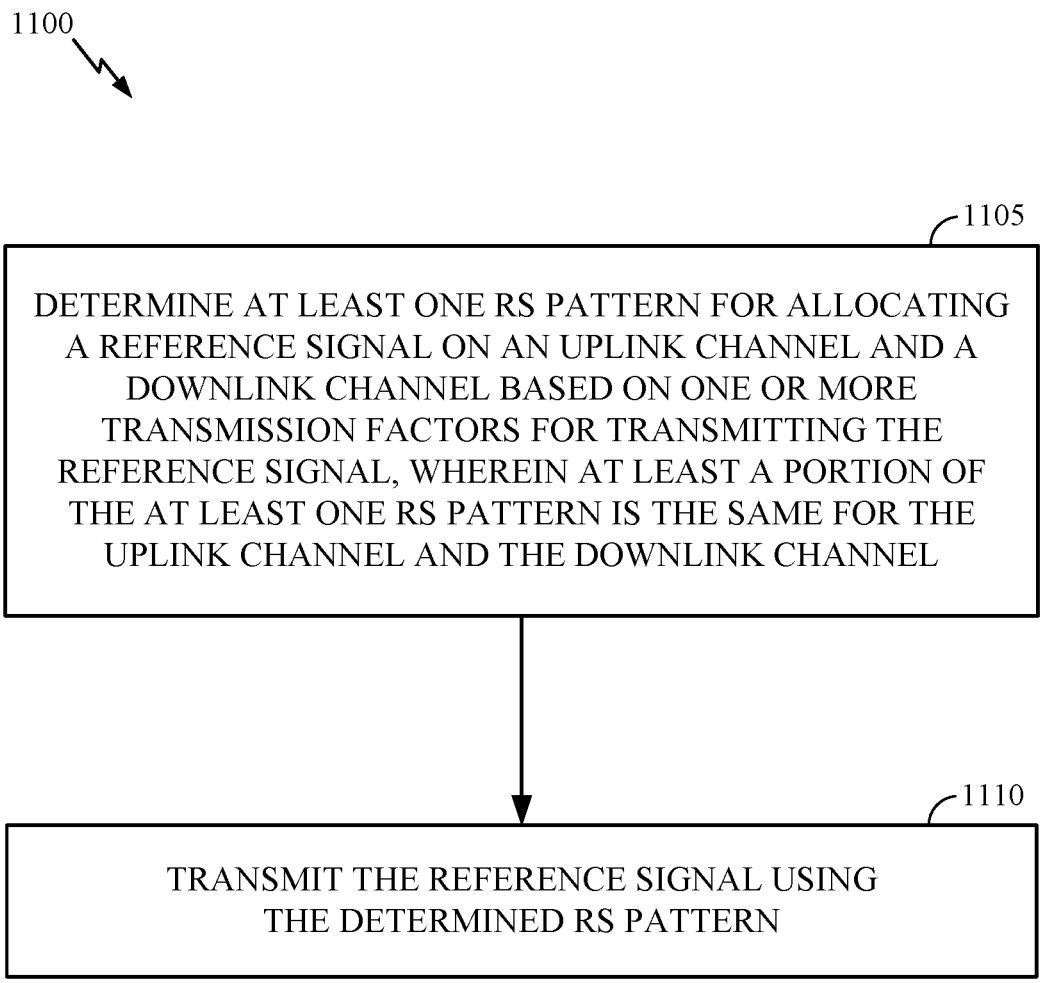
FIG. 11 is a flowchart illustrating example operations for allocating an RS according to some aspects of the present disclosure.

FIG. 11 is a flowchart illustrating example operations 1100 for allocating an RS according to some aspects of the present disclosure.

At 1105, at least one RS pattern for allocating a reference signal on an uplink channel and a downlink channel is determined based on one or more transmission factors for transmitting the reference signal, wherein at least a portion of the at least one RS pattern is the same for the uplink channel and the downlink channel. At 1110, the reference signal is transmitted using the determined RS pattern.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication, the method comprising:
    determining at least one reference signal (RS) pattern for allocating a reference signal on an uplink channel and a downlink channel based on one or more transmission factors for transmitting the reference signal, wherein the at least one RS pattern is the same for the uplink channel and the downlink channel;
    determining a reference signal sequence to use to generate the reference signal for a resource block based on a location of the resource block allocated for the reference signal, wherein the reference signal sequence for the resource block is a sub-sequence of a mother sequence occupying a bandwidth comprising a plurality of resources blocks, and wherein the sub-sequence represents a portion of the mother sequence;
    generating the reference signal utilizing the determined reference signal sequence; and
    transmitting the reference signal using the determined RS pattern.

2. The method of claim 1, wherein determining the RS pattern further comprises determining at least one of a number and location of symbols allocated to the reference signal, and tones of a symbol allocated to the reference signal.

3. The method of claim 2, wherein the RS pattern applies to a plurality of waveform types.

4. The method of claim 1, wherein the transmission factors comprise one or more of: payload size, a multipleinput-multiple-output (MIMO) configuration, a turnaround time requirement, and whether mixed waveforms are used for transmission.

5. The method of claim 1, further comprising explicitly configuring tones allocated to the reference signal.

6. The method of claim 5, further comprising receiving an indication in an uplink grant of whether mixed waveforms are used for transmission.

7. The method of claim 1, further comprising implicitly configuring tones allocated to the reference signal based on the one or more transmission factors for transmitting the reference signal.

8. The method of claim 1, wherein tones not allocated to the reference signal of a user equipment are used for transmission for a different antenna port than used for the reference signal transmission, for a different user equipment than used for the reference signal transmission, or for a same user equipment as used for the reference signal transmission for data transmission.

9. The method of claim 1, wherein tones allocated to the reference signal that are allocated for transmission from a plurality of user equipments using a same waveform or different waveforms are transmitted in different combs.

10. The method of claim 1, wherein reference signals in different combs use different sub-sequences of the same mother sequence with respect to comb locations.

11. The method of claim 1, further comprising:
    determining if a payload size of a frame structure of a physical uplink control channel (PUCCH) is equal to a payload size of a frame structure of a physical uplink shared channel (PUSCH); and
    determining the at least one reference signal pattern for the PUCCH based on a reference signal pattern for the PUSCH.

12. An apparatus for wireless communication comprising:
    a memory; and
    a processor configured to:
        determine at least one reference signal (RS) pattern for allocating a reference signal on an uplink channel and a downlink channel based on one or more transmission factors for transmitting the reference signal, wherein the at least one RS pattern is the same for the uplink channel and the downlink channel;
        determining a reference signal sequence to use to generate the reference signal for a resource block based on a location of the resource block allocated for the reference signal, wherein the reference signal sequence for the resource block is a sub-sequence of a mother sequence occupying a bandwidth comprising a plurality of resources blocks, and wherein the sub-sequence represents a portion of the mother sequence;
        generating the reference signal utilizing the determined reference signal sequence; and
        transmit the reference signal using the determined RS pattern.

13. The apparatus of claim 12, wherein to determine the RS pattern comprises to determine at least one of a number and location of symbols allocated to the reference signal, and tones of a symbol allocated to the reference signal.

14. The apparatus of claim 13, wherein the RS pattern applies to a plurality of waveform types.

15. The apparatus of claim 12, wherein the transmission factors comprise one or more of: a payload size, a multiple-input-multiple-output (MIMO) configuration, a turnaround time requirement, and whether mixed waveforms are used for transmission.

16. The apparatus of claim 12, wherein the processor is further configured to explicitly configure tones allocated to the reference signal.

17. The apparatus of claim 16, wherein the processor is further configured to receive an indication in an uplink grant of whether mixed waveforms are used for transmission.

18. The apparatus of claim 12, wherein the processor is further configured to implicitly configure tones allocated to the reference signal based on the one or more transmission factors for transmitting the reference signal.

19. The apparatus of claim 12, wherein tones not allocated to the reference signal of a user equipment are used for transmission for a different antenna port than used for the reference signal transmission, for a different user equipment than used for the reference signal transmission, or for a same user equipment as used for the reference signal transmission for data transmission.

20. The apparatus of claim 12, wherein tones allocated to the reference signal that are allocated for transmission from a plurality of user equipments using a same waveform or different waveforms are transmitted in different combs.

21. The apparatus of claim 12, wherein reference signals in different combs use different sub-sequences of the same mother sequence with respect to comb locations.

22. The apparatus of claim 12, wherein the processor is further configured to:
    determine if a payload size of a frame structure of a physical uplink control channel (PUCCH) is equal to a payload size of a frame structure of a physical uplink shared channel (PUSCH); and
    determine the at least one reference signal pattern for the PUCCH based on a reference signal pattern for the PUSCH.

23. An apparatus for wireless communication comprising:
    means for determining at least one reference signal (RS) pattern for allocating a reference signal on an uplink channel and a downlink channel based on one or more transmission factors for transmitting the reference signal, wherein the at least one RS pattern is the same for the uplink channel and the downlink channel;
    means for determining a reference signal sequence to use to generate the reference signal for a resource block based on a location of the resource block allocated for the reference signal, wherein the reference signal sequence for the resource block is a sub-sequence of a mother sequence occupying a bandwidth comprising a plurality of resources blocks, and wherein the sub-sequence represents a portion of the mother sequence;
    means for generating the reference signal utilizing the determined reference signal sequence; and
    means for transmitting the reference signal using the determined RS pattern.

24. The apparatus of claim 23, wherein the means for determining the RS pattern comprises means for determining at least one of a number and location of symbols allocated to the reference signal, and tones of a symbol allocated to the reference signal.

25. A non-transitory computer readable medium having instructions stored thereon for causing at least one processor to perform a method, the method comprising:
    determining at least one reference signal (RS) pattern for allocating a reference signal on an uplink channel and a downlink channel based on one or more transmission factors for transmitting the reference signal, wherein the at least one RS pattern is the same for the uplink channel and the downlink channel;

determining a reference signal sequence to use to generate the reference signal for a resource block based on a location of the resource block allocated for the reference signal, wherein the reference signal sequence for the resource block is a sub-sequence of a mother sequence occupying a bandwidth comprising a plurality of resources blocks, and wherein the sub-sequence represents a portion of the mother sequence;

generating the reference signal utilizing the determined reference signal sequence; and transmitting the reference signal using the determined RS pattern.

26. The non-transitory computer readable medium of claim 25, wherein determining the RS pattern comprises determining at least one of a number and location of symbols allocated to the reference signal, and tones of a symbol allocated to the reference signal.

* * * * *